3,245,984
AMINO-α-PHENYLALKYL PENICILLINS

Emilio Testa, Vacallo, Tessin, Switzerland, and Giorgio Cignarella and Giorgio Pifferi, Milan, Italy, assignors to Lepetit S.p.A., Milan, Italy, an Italian body corporate
No Drawing. Filed Sept. 17, 1962, Ser. No. 224,255
Claims priority, application Great Britain, Sept. 26, 1961, 34,459/61; Feb. 8, 1962, 4,892/62
4 Claims. (Cl. 260—239.1)

The present invention refers to a new process for preparing pharmacologically active compounds. More particularly the invention is concerned with the manufacture of synthetic penicillins starting from 6-aminopenicillanic acid of the formula:

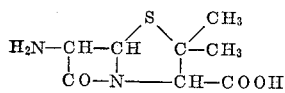

and their non toxic salts.

The above penicillins can be represented by the general formula:

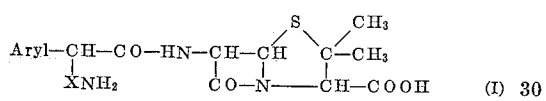

wherein X represents oxygen, alkylene or nil.

Their salts comprise non-toxic metal salts such as sodium, potassium, aluminum, ammonium and substituted ammonium salts, obtained by reaction with amines commonly used in the field of penicillins such as procaine, dibenzylamine and N,N¹-dibenzylethylenediamine.

The process for preparing the compounds of Formula I involves the condensation of the selected aminoacid with 6-aminopenicillanic acid. The methods of synthesis commonly used to form the carbamido link —NHCO— and widely employed for instance in the field of peptides, involve protection of the amino groups.

The final step of splitting off the protecting group involves procedures which, in the field of penicillins, cannot be carried out without affecting the thiazole ring such as catalytic hydrogenations or hydrolyses.

For instance the splitting off of the carbobenzyloxy protective group involves a catalytic hydrogenation which even if carried out under mild conditions causes a partial decomposition of the thiazole ring with consequent low yields of the final product.

The process for preparing the compounds of this invention overcomes these difficulties. It consists in reacting an alkali metal salt of 6-aminopenicillanic acid with an internal anhydride of the general formula:

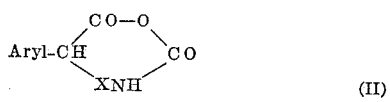

wherein X has the above significance in a mixture of water and an inert water soluble organic solvent such as acetone.

The above internal anhydride is obtained by treating the selected amino acid with phosgene according to the following scheme:

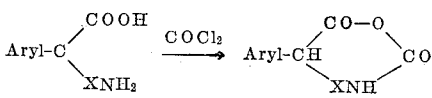

The subject of this invention is therefore a two-step process for preparing substances of high therapeutic usefulness, of which a part has been already disclosed in previous scientific works. The process is obviously applicable in all cases when the amino group of 6-aminopenicillanic acid is to be acylated with an acyl group deriving from a carboxylic acid which also possesses a free amino group.

To carry out the process, the selected amino acid is suspended in an anhydrous inert organic solvent, such as dioxane, tetrahydrofuran and toluene, and phosgene is bubbled into the solution until a complete solution is obtained. After evaporation of the solvent the internal anhydride is obtained. A solution of this anhydride in a water-miscible inert solvent is then contacted with a water solution of an about equivalent amount of an alkali metal salt of 6-aminopenicillanic acid at a temperature not exceeding about 20° C., then the solvent is evaporated and from the residue the formed penicillin is recovered through conventional procedures. For instance, after acidification of the reaction mixture with a mineral acid and filtration from some insoluble by-products, if present and evaporation to dryness in vacuo, the inorganic portion may be removed by filtration after having dissolved the residue in a solvent in which the penicillin is soluble.

Obviously, when these purification procedures lead to a solution of the penicillin in a solvent, remotion of the solvent by distillation will give the penicillin as the residue. In other cases, it will be preferable to isolate the penicillin as the alkali metal salt. At the end of the acylation reaction the water soluble product, which is the alkali metal salt of the penicillin, is separated by filtration from the insoluble portion, and from the solution the product is isolated by evaporation or by freeze-drying.

Though the process of the invention applies to both known and undescribed penicillins, the new penicillins obtained by the process are of high value and form a further subject of this application of particular interest are β-amino-α-phenylethylpenicillin and γ-amino-α-phenylpropylpenicillin. These substances possess an asymmetric carbon atom and the corresponding diastereoisomers may be prepared by usual procedures. For instance, the optically active forms of β-amino-α-phenylethylpenicillin are prepared starting from optically active α-phenyl-β-carbobenzoxyaminopropionic acids prepared from the racemate through its salt with optically active bases, such as quinine, strychnine, cinchonine and morphine.

The following table gives the minimal inhibitory concentration in γ/ml. in vitro of some of the new penicillins against some pathogenic microorganisms.

|  |  | DL-β-amino-α-phenylethylpenicillin | D-(−)-β-amino-α-phenylethylpenicillin | DL-γ-amino-α-phenylpropylpenicillin |
| --- | --- | --- | --- | --- |
| M. pyogenes aureus | ATCC 6538 | 0.01 | 0.05 | 0.05 |
| M. pyogenes aureus | ATCC 6538 | 1 | 0.5 | 0.5 |
| S. faecalis | ATCC 10541 | 20 | 5 | 10 |
| S. hemolyticus | C 203 | 0.5 | 0.05 | 0.5 |
| Diplococcus pneumoniae | XXVII L | 1 | 0.5 | 0.5 |
| Pasteurella multocida | ATCC 7707 | 1 | 0.5 | 0.5 |
| E. coli McLeod | ATCC 10536 | 5 | 2 | 2 |
| Proteus vulgaris X 19H | ATCC 881 | 100 | 100 | 100 |
| Proteus vulgaris X 190 | ATCC 9484 | 100 | 100 | 100 |
| Proteus rettgeri | ATCC 9919 | 5 | 2 | 2 |
| Proteus mirabilis H | ATCC 8259 | 1 | 0.5 | 0.5 |
| Proteus mirabilis O | ATCC 7975 | 1 | 0.5 | 0.5 |
| Salmonella typhi | Rome | 2 | 0.5 | 0.5 |
| Salmonella paratyphi | ATCC 9150 | 2 | 1 | 1 |
| Salmonella schottmuellari | ATCC 9149 | 2 | 1 | 1 |
| Salmonella typhimurium | ATCC 6994 | 2 | 2 | 1 |
| Shigella sonnei | ATCC 9290 | 10 | 5 | 5 |
| Shigella flexneri serotype 3 | ATCC 11836 | 5 | 2 | 1 |

The new penicillins show a high degree of resistance both to acids and penase. The behavior of some of the new penicillins in hydrochloric acid (pH=1) in comparison with phenoxyethylpenicillin, which is known as one of the penicillins less sensitive to acidic media, is shown in the following table. The percentages of non-degradated penicillin are tabulated at different times.

| Time in minutes | D-(−)-β-amino-α-phenylethylpenicillin | DL-γ-amino-α-phenylethylpenicillin | Phenoxymethylpenicillin |
| --- | --- | --- | --- |
| 0 | 100 | 100 | 90 |
| 30 | 93.5 | 94 | 75.4 |
| 60 | 88 | 90 | 60 |

The following non-limitative examples illustrate the process of the invention.

*Example 1.—DL-β-amino-α-phenylethylpenicillin*

*DL - 5 - phenyl-dihydro-1,3-oxazine-2,6-dione.*—Into a suspension of 5 g. of DL-β-amino-α-phenyl-propionic acid in 100 ml. of anhydrous dioxane a phosgene stream is bubbled through for 2 hours at 40–45° C. This mixture is then stirred for 2 hours to complete dissolution of the product. The solvent is removed in vacuo and the residue taken up with benzene and filtered. The product crystallises from acetone, 5.4 g. of DL-5-phenyl-dihydro-1,3-oxazine-2,6-dione, M.P. 120–4° C. dec.

*DL - β-amino-α-phenylethylpenicillin.*—6-aminopenicillanic acid sodium salt (4.8 g.) dissolved at 0° C. in 12 ml. water is added to a solution, previously cooled at 10–15° C. of DL-5-phenyl-dihydro-1,3-oxazine-2,6-dione (3.7 g.) in 25 ml. acetone. After half an hour stirring the temperature is allowed to rise at room temperature. An evolution of $CO_2$ is observed. After 30 minutes, the mixture is adjusted to pH 4.6, filtered and the filtrate evaporated to dryness in vacuo to give a crude product, which is taken up with methyl alcohol, filtered, and the clear solution obtained evaporated to dryness to give DL-β-amino-α-phenylethylpenicillin, M.P. 220–225° C.

*Example 2.—(+)-β-Amino-α-phenylethylpenicillin*

(a) *(+)-β-Amino-α-phenylpropionic acid.*—To a suspension of DL-β-amino-α-phenyl-propionic acid (16 g.) in ethyl alcohol (150 ml.), a hot solution of D-camphorsulphonic acid (24.5 g.) in ethyl alcohol (60 ml.) is added.

By cooling D-camphorsulphonate of (+)-β-amino-α-phenyl-propionic acid (23 g.) is obtained; $[\alpha]_D^{20°}=+63°$ (0.5% in water) M.P. 190–2° C. This salt is dissolved in water and NaOH is added to pH 5. By cooling a precipitate is obtained, which is filtered, washed and dried to give 7.7 g. of (+)-β-amino-α-phenyl-propionic acid; $[\alpha]_D^{20°}=+85°$ C. (0.5% in water), M.P. 223–6° C. dec.

(b) *(+) - 5 - phenyl-dihydro-1,3-oxazine-2,6-dione.*— Prepared as described in Example 1 for the racemic product.

(c) *(+) - β-Amino-α-phenylethylpenicillin.*—Prepared by the same procedure as described in Example 1.

Physico-chemical characteristics: $[\alpha]_D^{20°}=+203°$ C. (0.5% in water), M.P. 207–210° C. dec.

*Example 3.—(−)-β-Amino-α-phenylethylpenicillin*

Prepared from (−)-β-amino-α-phenylpropionic acid, isolated from the mother liquors obtained after the separation of the D-camphorsulphonate of (+)-β-amino-α-phenylpropionic acid (see Example 2), following the same procedure as described for the preceding penicillins; M.P. 225°–230° C. dec., $[\alpha]_D^{20°}=+203°$ C. (0.5% in water).

*Example 4.—DL-α-aminobenzylpenicillin*

*DL-2,5-dioxo-4-phenyloxazolidine.*—Into a suspension of 20 g. of DL-phenylglycine in 400 ml. of anhydrous dioxane a phosgene stream is bubbled through for 30 minutes at 40–45° C. The resulting mixture is then stirred for 3–4 hours to complete dissolution of the product. After filtration the filtrate is evaporated to dryness and the residue taken up with benzene and evaporated. The oily residue is poured into ice-water with stirring and the solid product which separates is extracted with ether. The organic layer is washed with ice-water, dried over sodium sulphate and the solvent evaporated to give a pasty solid which after trituration in benzene-petroleum ether yields 17.2 g. (73.5%) of DL-2,5-dioxo-4-phenyloxazolidine, M.P. 110–113° C.

*Analysis.*—Calcd. for $C_9H_7NO_3$: C, 61.02; H, 3.95; N, 7.80. Found: C, 61.44; H, 4.20; N, 7.64.

*DL-α-aminobenzylpenicillin.*—Four grams of 6-aminopenicillanic acid sodium salt dissolved at 0° C. in 10 ml. of water are added to a solution previously cooled at −15° C., of 2,5-dioxo-4-phenyloxazolidine in 20 ml. of acetone. After 30 minutes stirring the temperature is allowed to rise to room temperature. An evolution of $CO_2$ is observed. After 30 minutes, the mixture is filtered, and the pasty solid is triturated in acetone yielding 1.5 g. of a white solid which is suspended in 15 ml. of water and filtered. The combined filtrates are freeze dried giving a yellowish solid having M.P. 225–230° C. which is the sodium salt of DL-α-aminobenzylpenicillin.

*Example 5.—D-(−)-α-aminobenzylpenicillin*

Prepared by the same process as described in Example 4.

The intermediate D-(−)-2,5-dioxo-4-phenyloxazolidine has M.P. 127–129° C. $[\alpha]_D=-110$ (C=1% in dioxane). An elemental analysis gives results in good accordance with the expected crude formula $C_9H_7NO_3$.

*Examples 6 to 8*

By the same process as described in the preceding examples the following penicillins were prepared:

α-Aminoxybenzylpenicillin, M.P. 78–85° C.
α-Phenyl-γ-aminopropylpenicillin, M.P. 193–195° C.
α-Phenyl-δ-aminobutylpenicillin, M.P. 180–185° C.

We claim:
1. β-Amino-α-phenylethylpenicillin.
2. (−)-β-Amino-α-phenylethylpenicillin.
3. γ-Amino-α-phenylpropylpenicillin.
4. δ-Amino-α-phenylbutylpenicillin.

References Cited by the Examiner

UNITED STATES PATENTS

| | | | |
|---|---|---|---|
| 2,735,848 | 2/1956 | Edgerton et al. | 260—239.1 |
| 2,883,391 | 4/1959 | Swain | 260—307 |
| 2,951,839 | 9/1960 | Doyle et al. | 260—239.1 |
| 2,985,648 | 5/1961 | Doyle et al. | 260—239.1 |
| 2,996,513 | 8/1961 | Ballard | 260—307 |
| 3,080,356 | 3/1963 | Catlin et al. | 260—239.1 |
| 3,120,514 | 2/1964 | Doyle et al. | 260—239.1 |
| 3,144,445 | 8/1964 | Grant et al. | 260—239.1 |

FOREIGN PATENTS

| | | |
|---|---|---|
| 622,901 | 1/1963 | Belgium. |
| 873,049 | 7/1961 | Great Britain. |

OTHER REFERENCES

Elderfield, Heterocyclic Compounds, published by John Wiley and Sons, New York, 1957, page 406, vol. 5.

NICHOLAS S. RIZZO, *Primary Examiner.*